May 5, 1970
C. W. HORNER
3,510,523
EXOTHERMIC CATALYTIC REACTIONS WITH THERMOSYPHON FLOW
Filed June 14, 1967
2 Sheets-Sheet 1
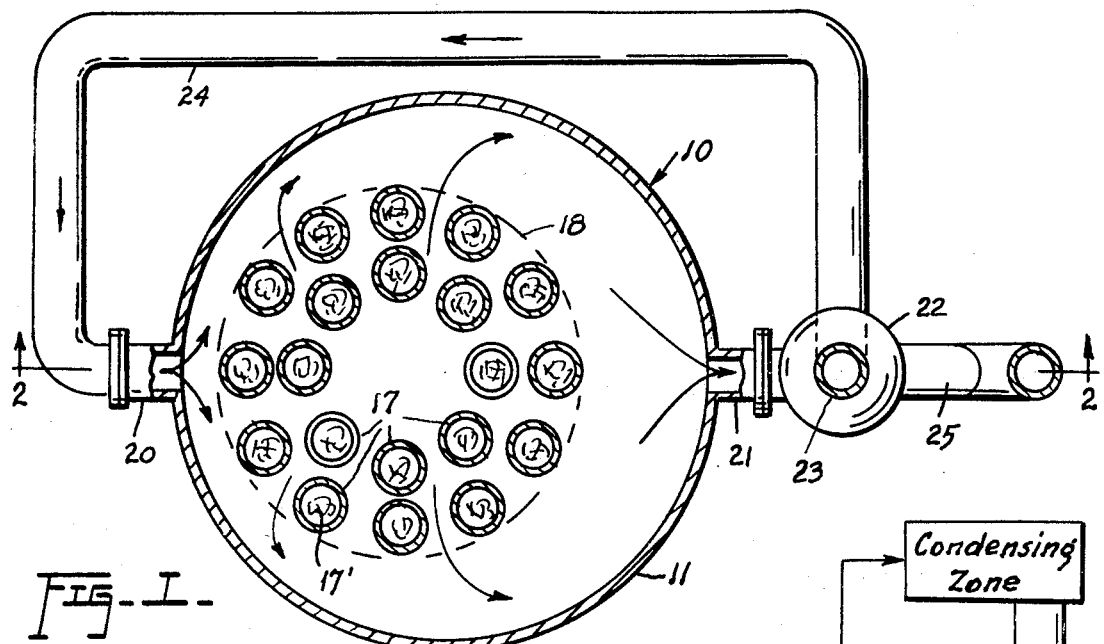
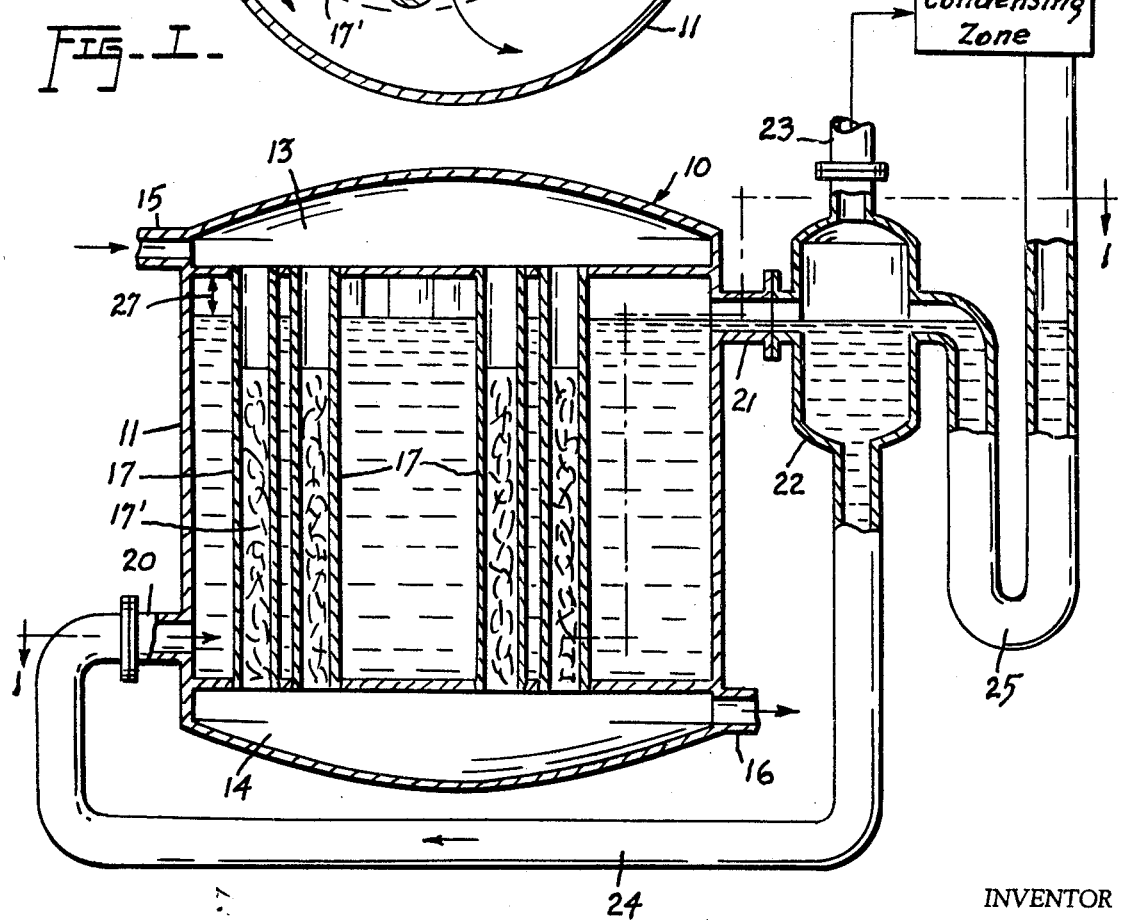
INVENTOR
Charles W. Horner
BY
Munson H. Lane
ATTORNEY United States Patent Office 3,510,523
Patented May 5, 1970

3,510,523
EXOTHERMIC CATALYTIC REACTIONS WITH THERMOSYPHON FLOW
Charles W. Horner, Mount Kisco, N.Y., assignor to Reichhold Chemicals, Inc., White Plains, N.Y.
Filed June 14, 1967, Ser. No. 646,110
Int. Cl. C07c 45/16
U.S. Cl. 260—603                                       4 Claims

ABSTRACT OF THE DISCLOSURE

An exothermic catalytic reactor having a group of catalyst containing tubes surrounded by a liquid heat exchange medium, the reactor also having a liquid inlet and a liquid-vapor outlet, the latter being directed into a second vessel at the outside of the reactor. The bottom of the second vessel comunicates with the liquid inlet of the reactor, while the top of the second vessel leads to a condensing zone where vapor is transformed into cool liquid which is then passed into the second vessel for mixing with the liquid already there. Such mixing increases the density of the liquid in the second vessel as compared to that in the reactor, as a result of which a thermosyphon flow of liquid between the second vessel and the reactor is established and maintained without the use of a circulating pump.

This invention relates to an improved process and apparatus for carrying out highly exothermic catalytic reactions, particularly those relating to vapor phase oxidation of alcohols to aldehydes, as set forth, for example, in U.S. Pat. Nos. 2,812,308; 2,812,309; 2,812,319; 2,849,492; 2,849,493; 2,852,564 and 2,973,326, and more specifically to the maintenance of an empirically determined optimum temperature profile down through the catalyst bed, resulting in the controlling of the temperature and selectivity of such reactions within more precise limits to approach theoretically optimum conditions with commercial apparatus. It is well known, in vapor-phase catalytic oxidation systems, that more than just a single reaction is taking place within the catalyst bed and that the reaction stream must be heated up to reaction temperature and then cooled.

Generally speaking, the depth of the catalyst bed may be divided into three zones, (1) preheating wherein the air-alcohol mixture is heated to the reaction temperature; (2) the reaction zone wherein the reactions are generating heat; and (3) the quenching or cooling zone wherein the reactions have stopped or slowed down and the reaction stream is being cooled.

In producing a product or products from the air-alcohol stream, it is difficult to calculate the reaction rates, rate of heat release, total heat generated, et cetera, in order to describe the system mahematically so that it might be optimized, since several reactions are taking place simultaneously, both endothermic and exothermic.

In the laboratory such conditions are determined empirically by changing the physical conditions such as flow rate, temperature, heat transfer rates, contact time, et cetera, and measuring the effect by analyzing the effluent stream and plotting the temperature profile of the catalyst bed. However, it is difficult to duplicate laboratory conditions in a plant of commercial size in terms of the heat transfer rates, and hence the temperature profile, since in working with a single tube or small group of tubes it is relatively easy to secure optimum heat transfer by forced circulation or agitation of the heat transfer media.

Warner Pat. No. 2,852,564 describes a method whereby the laboratory conditions may be obtained through the use of pumped heat transfer media around the reactor at such a rate as to provide substantially liquid film heat transfer coefficients.

However, as a recator becomes larger in size, it becomes impractical and unecomical to use a pump, because of large energy expenditures and increased capital cost.

The present invention obtains the required heat transfer rates without the use of a pump, by utilizing boiling film transfer coefficients and supplemental liquid circulation provided by thermosyphon flow of liquid between the reactor and a second vessel, the driving force or energy being provided by a difference in densities between the liquids in the two vessels. This supplemental liquid flow is especially required in the reaction zone where the difference in temperature between the catalyst or the tube walls and the heat transfer media surrounding the tube, and the amount of heat from the reaction are such that the heat flux is greater than can be transmitted by a normal boiling film due to he formation of a vapor film of low thermal conductivity on the outside of the tube. With supplemental liquid flow the formation of vapor film is curtailed and the required heat flux is maintained.

Accordingly, the invention pertains to the establishment and maintenance of an ideal temperature profile down through the catalyst bed by the establishment of a flow of liquid up between the tubes in a multi-tube catalytic reactor, which improves the heat transfer throughout but especially in the reaction zone where the desired rate of heat release per unit area or heat flux is greater than that which can be provided by an unaided boiling film coefficient. Such flow is established and maintained by thermosyphoning the heat transfer fluid between the reactor and the second vessel, into which cold condensate is introduced to cause a difference in density between the liquid in that vessel and the reactor, thus producing a flow of liquid between the two, substantially greater than the flow of the condensate.

The invention will be more clearly understood from reference to the accompanying drawings, wherein like numerals are used to designate like parts, and wherein:

FIG. 1 is a horizontal sectional view of a multi-tube reactor with the associated thermosyphon vessel, taken substantially in he plane of the line 1—1 in FIG. 2;

FIG. 2 is a vertical sectional view, taken substantially in the plane of the line 2—2 in FIG. 1.

Figure 3:
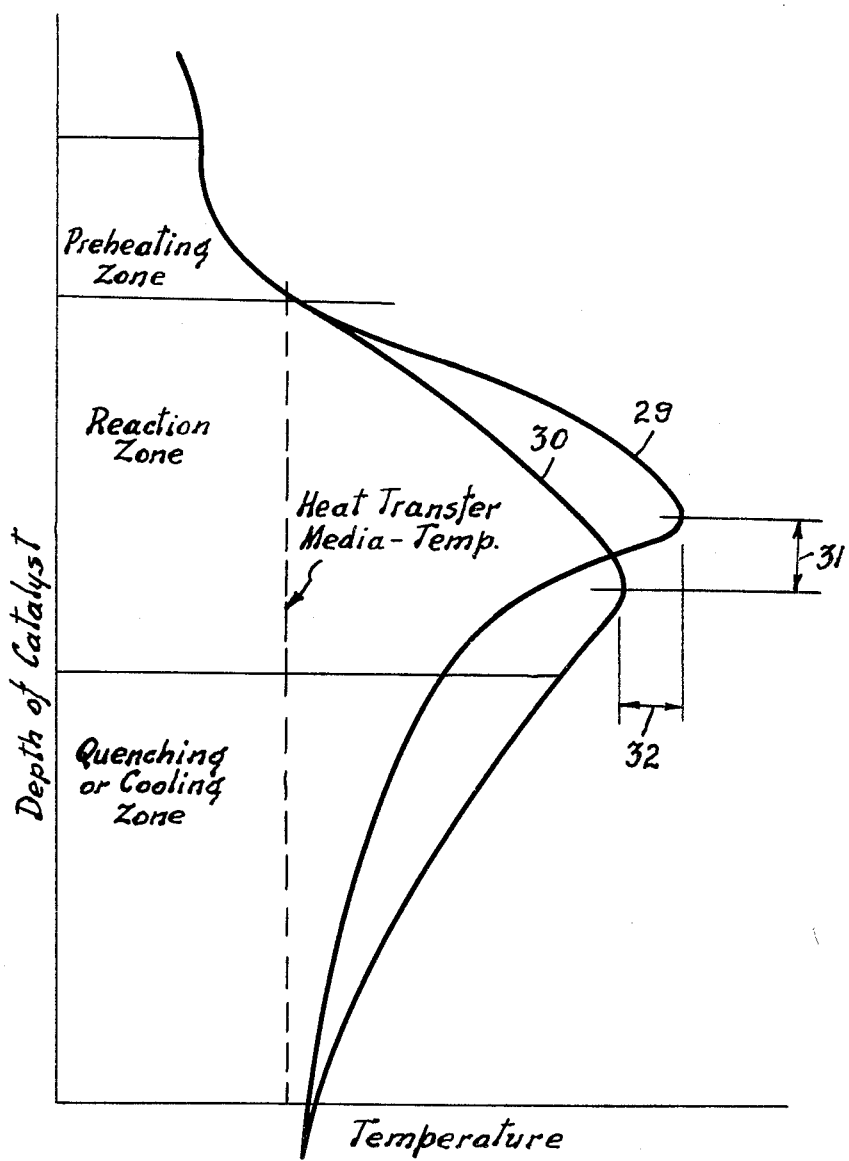
FIG. 3 is a diagram of temperature profiles of the catalyst bed.

As shown in FIGS. 1 and 2, the reactor 10 comprises a circular or cylindrical outer shell 11 equipped with headers 13, 14, the header 13 having an inlet 15 for exothermic gases, while the header 14 has an outlet 16 for reaction products.

The shell 11 contains a plurality of tubes 17 containing a catalyst bed 17'. These tubes are preferably although not necessarily disposed in a circle having an outer periphery indicated at 18 in FIG. 1. The circle of tubes may be concentric with the shell 11, although preferably it is eccentric, in accordance with a separate invention entitled "Apparatus and Method for Exothermic Catalytic Reactions" as disclosed in a patent application of Herbert E. Miegel, Ser. No. 646,071, filed June 14, 1967.

The reactor shell 11 is also provided with a liquid heat exchange medium inlet pipe 20 disposed adjacent the lower header 14, and with a vapor-liquid outlet pipe 21 disposed adjacent the upper header 13. The pipe 21 communicates with a thermosyphon vessel 22, the top of the latter being provided with a vapor outlet pipe 23 extending to suitable condensing means, such as described in the aforementioned Warner Pat No. 2,852,564, although others may be employed. The bottom of the vessel 22 is provided with a liquid return pipe 24 extending to the inlet 20 of the reactor, and one side of the vessel 22 is equipped with a cold liquid return pipe 25 extending from the condensing zone.

The vessel 22 is so positioned relative to the reactor 10 that prior to admission of reactive gases through the inlet 15, the level of liquid in the reactor is the same as in the vessel 22, such liquid level affording an internal vapor space in the reactor as indicated at 27 in FIG. 2. Also, the temperature of liquid in both the reactor and the vessel 22 is the same. After the flow of reactive gases has started, the liquid in the reactor 10 is heated to its boiling temperature, and vapor therefrom is liberated in the vapor space 27. This vapor flows through the pipe 21 into the upper portion of the vessel 22 and then through the pipe 23 to the condensing zone, whereupon as cold liquid it is returned to the vessel 22 through the pipe 25. There the cold liquid mixes with the liquid already there, thus increasing its mass and cools it below the temperature of the liquid in the reactor 10, the density of the liquid in the vessel 22 being thus increased. At the same time, the density of the liquid in the reactor 10 has been decreased by its rise in temperature to the boiling point and also by release of bubbles of vapor which, in rising to the surface of the liquid, produce an apparent decrease in density.

Thus, there are two interconnected zones of different density of the liquid, that is, high density liquid in the vessel 22 and low density liquid in the reactor 10, and since these different liquid densities have a strong tendency to become balanced on the basis of liquid weight and liquid surface pressure in the two respective zones, a thermosyphon flow of liquid from the vessel 22 to the reactor 10 through the pipe 24 is established.

The rate of the thermosyphon flow may be regulated by increasing or decreasing the liquid level in the reactor 10 or vessel 22, since the effect of the additional level in the reactor 10 is not as great due largely to the presence of vapor bubbles, thus an increase in liquid level will cause a greater difference in apparent density and a greater recirculation of liquid from the reactor to the vessel 22.

The system hereinbefore described has been used successfully in commercial applications in the process of making organic aldehydes from alcohol, especially formaldehyde by vapor phase oxidation of methanol using Dowtherm as the two phase heat transfer medium, as set forth in the patents enumerated in the opening paragraph of this specification, but it is not necessarily limited thereto.

FIG. 3 shows temperature readings taken in a reactor designed according to the disclosures of either U.S. Pat. No. 1,604,739 or 2,852,564. It will be noted that the temperature profile 29 shows a slightly higher activity by an earlier temperature rise and a higher temperature peak prior to cooling than the temperature profile 30 which is one obtained in the laboratory and represents conditions for optimum operation. In actual measurement, readings have been found which have a depth of displacement indicated at 31 as high as 6 inches of the tube length and a temperature displacement indicated at 32 having a temperature difference as high as 60° C. However, using the apparatus and method of this invention under similar reaction conditions, the depth displacement 31 has been found to be a maximum of 1 inch of tube length or less, and the temperature displacement 32 to be a maximum of 30° C.

While in the foregoing there has been shown and described the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. The combination of an exothermic catalytic reactor having a group of catalyst containing tubes surrounded by a liquid heat exchange medium and also having a liquid inlet and a liquid-vapor outlet, a second vessel disposed exteriorly of said reactor and receiving liquid-vapor from said outlet, the bottom of said second vessel communicating with said liquid inlet of the reactor, the top of the second vessel communicating with a vapor condensing zone, and a cold liquid return from the condensing zone to the second vessel for mixing cold liquid with liquid already there, whereby to increase the liquid density in the second vessel relative to that in the reactor and establish a thermosyphon flow of liquid between the second vessel and the reactor in the absence of a circulating pump, the reactor having a vapor space above the level of liquid therein, said liquid-vapor outlet and said second vessel being positioned so that they are horizontally intersected by the liquid level in the reactor, whereby vapor may pass from said space into the upper portion of the second vessel.

2. The combination as defined in claim 1 wherein said cold liquid return from the condensing zone communicates with one side of said second vessel.

3. The combination as defined in claim 2 wherein the cold liquid return pipe includes an inverted gooseneck connection.

4. A method for establishing and maintaining a thermosyphon flow of a liquid heat exchange medium through an exothermic catalytic reactor in the absence of a circulating pump, said method comprising the steps of passing liquid-vapor from the reactor into a second vessel which has its bottom in communication with a liquid inlet of the reactor, the liquid-vapor outlet of the reactor and the liquid-vapor inlet of the second vessel being at substantially the same level and with a substantially horizontal liquid-vapor passage connecting said inlet and outlet, passing vapor from the second vessel through a condensing zone, and returning cool condensed liquid from the condensing zone to the second vessel for mixing with the liquid already there, whereby to increase the density of liquid in the second vessel relative to that in the reactor and establish a thermosyphon flow of the liquid from the former to the latter.

References Cited

UNITED STATES PATENTS

| | | | |
|---|---|---|---|
| 3,363,992 | 1/1968 | Chervenak | 23—288 |
| 1,900,715 | 3/1933 | Jaegar | 23—288.92 |

LEON ZITVER, Primary Examiner

R. H. LILES, Assistant Examiner

U.S. Cl. X.R.

23—288; 260—700